United States Patent [19]

Tanaka et al.

[11] Patent Number: 5,535,317
[45] Date of Patent: Jul. 9, 1996

[54] GRAPH DISPLAY APPARATUS FOR DIFFERENT COORDINATE SYSTEMS

[75] Inventors: Hidekazu Tanaka; Kazuhiko Arikawa, both of Fussa; Yoshinori Asayama, Hamura; Syunsuke Akaza, Fussa; Kyoko Lin; Osamu Negishi, both of Akishima; Mitsuru Okano, Fussa, all of Japan

[73] Assignee: Casio Computer Co., Ltd., Tokyo, Japan

[21] Appl. No.: 343,770

[22] Filed: Nov. 22, 1994

[30] Foreign Application Priority Data

Nov. 25, 1993 [JP] Japan ............................ 5-295068
Nov. 30, 1993 [JP] Japan ............................ 5-299488

[51] Int. Cl.⁶ .................................................. G06T 11/00
[52] U.S. Cl. ................ 395/140; 364/710.01; 364/710.14
[58] Field of Search ........................ 395/140, 155–161; 364/710.01–710.14

[56] References Cited

U.S. PATENT DOCUMENTS

| | | | |
|---|---|---|---|
| 4,794,553 | 12/1988 | Watanabe et al. | 364/710.01 |
| 4,794,554 | 12/1988 | Tamiya | 364/710.01 |
| 5,046,024 | 9/1991 | Smith et al. | 364/736 X |
| 5,303,338 | 4/1994 | Handa et al. | 395/140 |

OTHER PUBLICATIONS

Patent Abstracts of Japan, vol. 16, No. 586 (P–1463) Dec. 25, 1992 & JP–A–04 235 658 (Casio Computer Co., Ltd.).
Patent Abstracts of Japan, vol. 16, No. 439 (P–1420) Sep. 14, 1992 & JP–A–04 151 692 (Toshiba Corporation).
Patent Abstracts of Japan, vol. 17, No. 29 (P–1472) Jan. 20, 1993 & JP–A–04 251 371 (Casio Computer Co., Ltd.).

*Primary Examiner*—Almis R. Jankus
*Attorney, Agent, or Firm*—Frishauf, Holtz, Goodman, Langer & Chick

[57] ABSTRACT

A graph display apparatus includes a plurality of functional formulas to be displayed as graphs and their coordinate ranges are stored in a memory by operating numeric · symbol keys on a key input unit. The plurality of stored formulas are displayed on a display unit by operating a "list" key. When a plurality of arbitrary formulas are designated and a "synthesis" key is operated, the graphs of the designated formulas are calculated and displayed on a single coordinate system in accordance with coordinate ranges of the formula which is designated first. When the plurality of arbitrary formulas are designated and a "division" key is operated, the functional formulas are displayed on different coordinate systems in accordance with corresponding coordinate ranges. When the graphs of a plurality of input formulas are calculated and displayed, the individual graphs can be appropriately synthesized or divided and can be displayed in comparison with each other.

13 Claims, 13 Drawing Sheets

1. Y = X+1
2. r = sinθ
3. Xt = 2cosT
   Yt = 2sinT
4.
5.

X = 0.70711   Y = 1.70711

5,535,317

GRAPH DISPLAY APPARATUS FOR DIFFERENT COORDINATE SYSTEMS

BACKGROUND OF THE INVENTION

1. Field of the Invention

The present invention relates to a graph display apparatus for calculating the graph of a functional formula or the like, and displaying the calculated graph and, more particularly, to a graph display apparatus comprising a display unit for simultaneously displaying the graphs of a plurality of functional formulas on a single X-Y coordinate system or different X-Y coordinate systems.

2. Description of the Related Art

A graph display apparatus, which, by inputting a functional formula $Y=f(x)$, e.g., $Y=X^2$, and designating display ranges of X and Y, displays the graph of $Y=X^2$ within the designated ranges on the X-Y coordinate system, has been commercially available, and such a technique is described in, e.g., U.S. Pat. No. 4,794,553 and U.S. Pat. No. 4,794,554. Some graph display apparatuses of this type have a function of simultaneously displaying the graphs of a plurality of functional formulas on a single X-Y coordinate system. When the graphs of a plurality of functional formulas are simultaneously displayed on a single X-Y coordinate system, all the functional formulas have the same display range, and it is impossible to display functional formulas with different display ranges in comparison with each other.

When the graphs of functional formulas are displayed, the functional formulas often have different coordinate systems. For example, as the coordinate systems, orthogonal coordinates, polar coordinates, parameter coordinates, and the like are used in correspondence with different functional formulas. These different coordinate systems must be independently displayed.

SUMMARY OF THE INVENTION

The present invention has been made in consideration of the above situation, and has as its object to provide a graph display apparatus, which can calculate the graphs of a plurality of functional formulas on the basis of different display ranges, and can simultaneously display the calculated graphs.

It is another object of the present invention to provide a graph display apparatus, which can simultaneously display functional formulas having different coordinate systems.

In order to achieve the above objects, according to the present invention, a graph display apparatus comprises: graph display means capable of displaying a graph; a plurality of display range data storage means for storing display range data of a plurality of formulas whose graphs are displayed on the graph display means; display mode selection means for selecting one of a display mode for displaying graphs of the plurality of formulas on a single coordinate system and a display mode for displaying graphs of the plurality of formulas on different coordinate systems; first display control means for, when the display mode selection means selects the display mode for displaying graphs of the plurality of formulas on a single coordinate system, displaying coordinate axes based on display range data stored in one of the plurality of display range data storage means on the graph display means, and displaying graphs of the plurality of formulas in correspondence with the coordinate axes; and second display control means for, when the display mode selection means selects the display mode for displaying graphs of the plurality of formulas on different coordinate systems, reading out display range data corresponding to the plurality of formulas from the plurality of display range data storage means, and simultaneously displaying graphs of the plurality of formulas in corresponding display ranges.

With this arrangement, according to the present invention, the graphs of a plurality of functional formulas can be simultaneously displayed in comparison with each other.

BRIEF DESCRIPTION OF THE DRAWINGS

FIGS. 1 through 6D show the first embodiment of the present invention, in which

FIG. 1 is a plan view showing the outer appearance of a graph display apparatus according to the first embodiment of the present invention, FIG. 2 is a block diagram showing the arrangement of an electronic circuit of the graph display apparatus, FIG. 3 is a flow chart showing formula input/graphic processing of the graph display apparatus, FIG. 4 is a flow chart showing synthetic/divisional graphic processing of a plurality of formulas in the graph display apparatus, FIG. 5 is a flow chart showing division/synthesis/copy processing in a graph display apparatus of the graph display apparatus, and FIGS. 6A through 6D are views showing display states on a graphic display unit upon execution of graphic display processing of the graph display apparatus, in which FIG. 6A is a view showing a list display state of input formulas, FIG. 6B is a view showing a synthetic display state of the graphs of a plurality of formulas, FIG. 6C is a view showing a divisional display state of the graphs of a plurality of formulas, and FIG. 6D is a view showing a synthetic display state of designated graphs in the divisional display state of the graphs of a plurality of formulas; and FIGS. 7 through 16 show the second embodiment of the present invention, in which FIG. 7 is a plan view showing the outer appearance of a functional calculator according to the second embodiment of the present invention, FIG. 8 is a block diagram showing the arrangement of an electronic circuit of the functional calculator, FIG. 9 is a flow chart showing overall processing in a graph mode of the functional calculator, FIG. 10 is a flow chart showing graphic arithmetic processing upon execution of graph mode processing of the functional calculator, FIG. 11 is a flow chart showing overall intersection arithmetic processing upon execution of the graph mode processing of the functional calculator, FIG. 12 is a flow chart showing intersection arithmetic processing between a polar coordinate system graph and an orthogonal coordinate system graph upon execution of the overall intersection arithmetic processing of the functional calculator, FIG. 13 is a flow chart showing intersection arithmetic processing between a parameter coordinate system graph and an orthogonal coordinate system graph upon execution of the overall intersection arithmetic processing of the functional calculator, FIG. 14 is a flow chart showing intersection arithmetic processing between a polar coordinate system graph and a parameter coordinate system graph upon execution of the overall intersection arithmetic processing of the functional calculator, FIG. 15 is a view showing an input/display state of functional formulas upon execution of the overall processing in the graph mode of the functional calculator, and FIG. 16 is a view showing an intersection coordinate display state upon execution of the intersection arithmetic processing between the polar coordinate system graph and the orthogonal coordinate system graph.

DETAILED DESCRIPTION OF THE PREFERRED EMBODIMENTS (First Embodiment)

FIGS. 1 through 6D show the first embodiment of the present invention.

Figure 1:
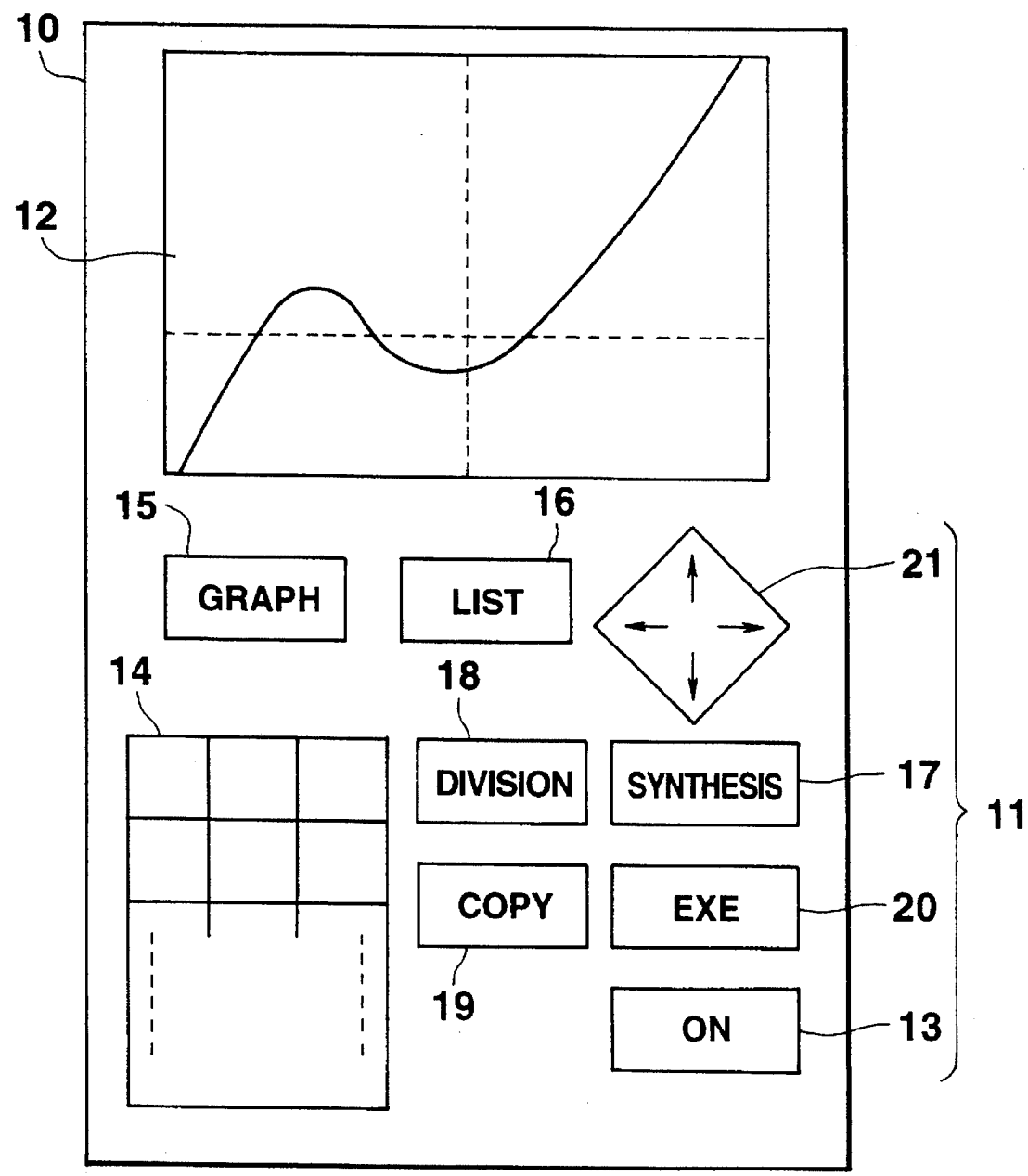

FIG. 1 is a plan view showing the outer appearance of a graph display apparatus according to the present invention.

A main body 10 of this graph display apparatus has a size which allows a user to hold the apparatus in his or her hand.

A key input unit 11 and a dot-matrix liquid crystal display unit 12 are arranged on the front surface of the main body 10.

The key input unit 11 comprises an "ON" key 13 for turning on/off a power supply, numeric · symbol keys 14 for inputting functional formula data to be displayed as a graph and for inputting coordinate range (Xmin, Xmax) and (Ymin, Ymax) data of the X- and Y-axes as display ranges upon display of a graph by the display unit 12, a "graph" key 15 for executing a display of the graph of input functional formula data, a "list" key 16 for simultaneously displaying a plurality of input functional formula data, a cursor key 21 for selecting functional formula data to be displayed as graphs from a plurality of functional formula data displayed upon depression of the list key 16, a "synthesis" key 17 for synthetically displaying the graphs of a plurality of functional formula data arbitrarily designated by the cursor key 21 on a single coordinate system, or for synthetically displaying graphs divisionally displayed on different coordinate systems on a coordinate system of another graph, a "division" key 18 for divisionally displaying arbitrarily designated ones of the plurality of displayed functional formula data on different coordinate systems or for displaying a plurality of graphs synthetically displayed on the single coordinate system on different coordinate systems, a "copy" key 19 for copy-displaying graphs displayed on the different coordinate systems on another graph, an "EXE" key 20 for executing the above-mentioned "synthesis", "division", and "copy" functions, and the like.

The display unit 12 has a display region defined by, e.g., 64 dots in the vertical direction and 128 dots in the horizontal direction, and displays functional formula data consisting of numerical values and characters and coordinate range data of the X- and Y-axes input by the numeric · symbol keys 14. The display unit 12 graphically displays the graph of input functional formula data in accordance with the designated coordinate ranges of the X- and Y-axes.

In the graphic display, a display is made using the entire display region as the designated coordinate ranges of the X- and Y-axes, or when two out of a plurality of formulas displayed in the list are designated, the display region is divided into two regions, i.e., right and left regions, and the graphs of the designated formulas are displayed on these display regions. Furthermore, when three or four formulas are designated, the display regions are divided into four regions in the vertical and horizontal directions, and the graphs of the designated functional formulas are displayed on the divided display regions.

Figure 2:
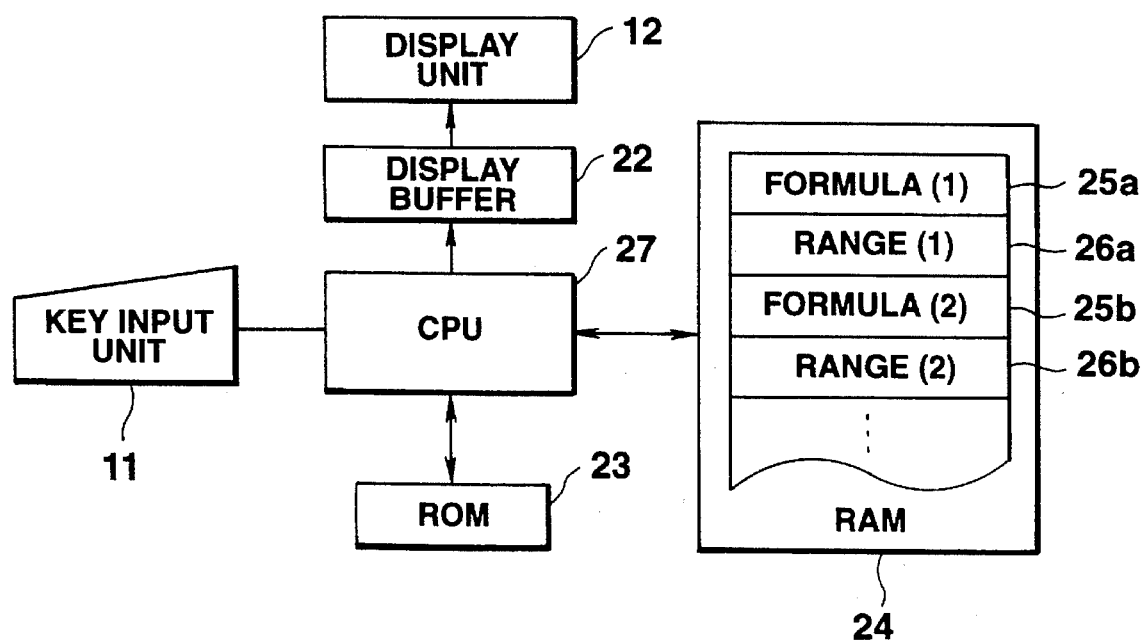

FIG. 2 is a block diagram showing the arrangement of an electronic circuit of the graph display apparatus.

The electronic circuit of the graph display apparatus comprises a CPU (central processing unit) 27, and the CPU 27 executes operation control of the respective circuit units.

The CPU 27 is connected to the key input unit 11 and to the display unit 12 via a display buffer 22, and is also connected to a ROM (read-only memory) 23 and a RAM (random-access memory) 24.

The ROM 23 pre-stores a basic system program for operating this graph display apparatus, and also pre-stores a graph display processing program for displaying graphs in correspondence with key-input functional formulas and the like, a synthesis processing program for synthetically displaying the graphs of a plurality of formulas on a single coordinate system, a division processing program for divisionally displaying the graphs of a plurality of formulas on independent coordinate systems, a copy program for copy-displaying one graph one the other graph, and the like.

The control operation of the CPU 27 is executed in accordance with the programs stored in the ROM 23.

The RAM 24 comprises formula registers 25a, 25b ... for individually storing and managing a plurality of input functional formula data, range registers 26a, 26b, ... for storing coordinate ranges (Xmin, Xmax) and (Ymin, Ymax) set in correspondence with the individual functional formulas stored in the formula registers 25a, 25b, ..., and the like, in addition to key input registers, various flag registers (not shown), and the like.

The operation of the graph display apparatus with the above arrangement will be described below.

Figure 3:
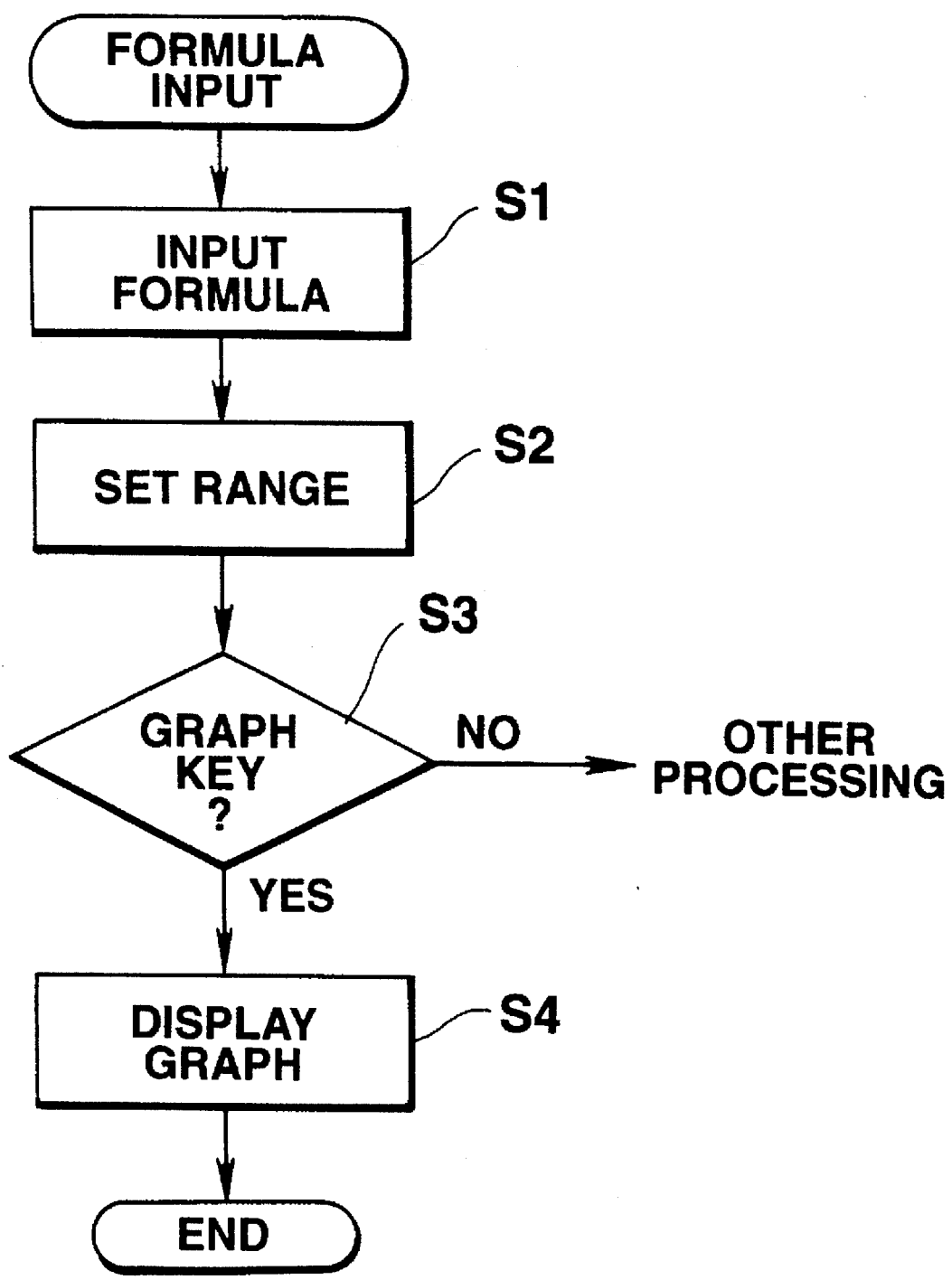

FIG. 3 is a flow chart showing graphic processing for displaying the graph of an input functional formula in the graph display apparatus.

More specifically, functional formula data to be displayed as a graph is key-input using the numeric !& symbol keys 14 on the key input unit 11 in step S1, and coordinate range data of the X- and Y-axes upon display of the graph of the input formula are input in step S2. The formula data input in step S1 is stored in one of the formula registers 25a, 25b ... in the RAM 24, and the coordinate range data input in step S2 are stored in one of the range registers 26a, 26b, ... corresponding to the input formula.

When a user operates the "graph" key 15, this operation is detected in step S3, and graph display processing is executed in step S4. For example, in accordance with the X- and Y-coordinate ranges stored in the range register 26a in correspondence with the first formula stored in the formula register 25a, X-coordinates corresponding to display pixels in the X-axis direction are substituted in the first formula to sequentially calculate Y-coordinates, pixel positions in the X- and Y-directions corresponding to the calculated coordinate points (X, Y) are calculated, and pixels at the calculated positions are turned on, thereby displaying a graph on the display unit 12, as shown in, e.g., FIG. 1. Such a graph display is described in U.S. Pat. No. 4,794,553.

Upon repetition of the processing shown in FIG. 3, a plurality of functional formula data are stored in the formula registers 25a, 25b, ..., and display range data are stored in the corresponding range registers 26a, 26b, ... in correspondence with the functional formula data.

Figure 4:
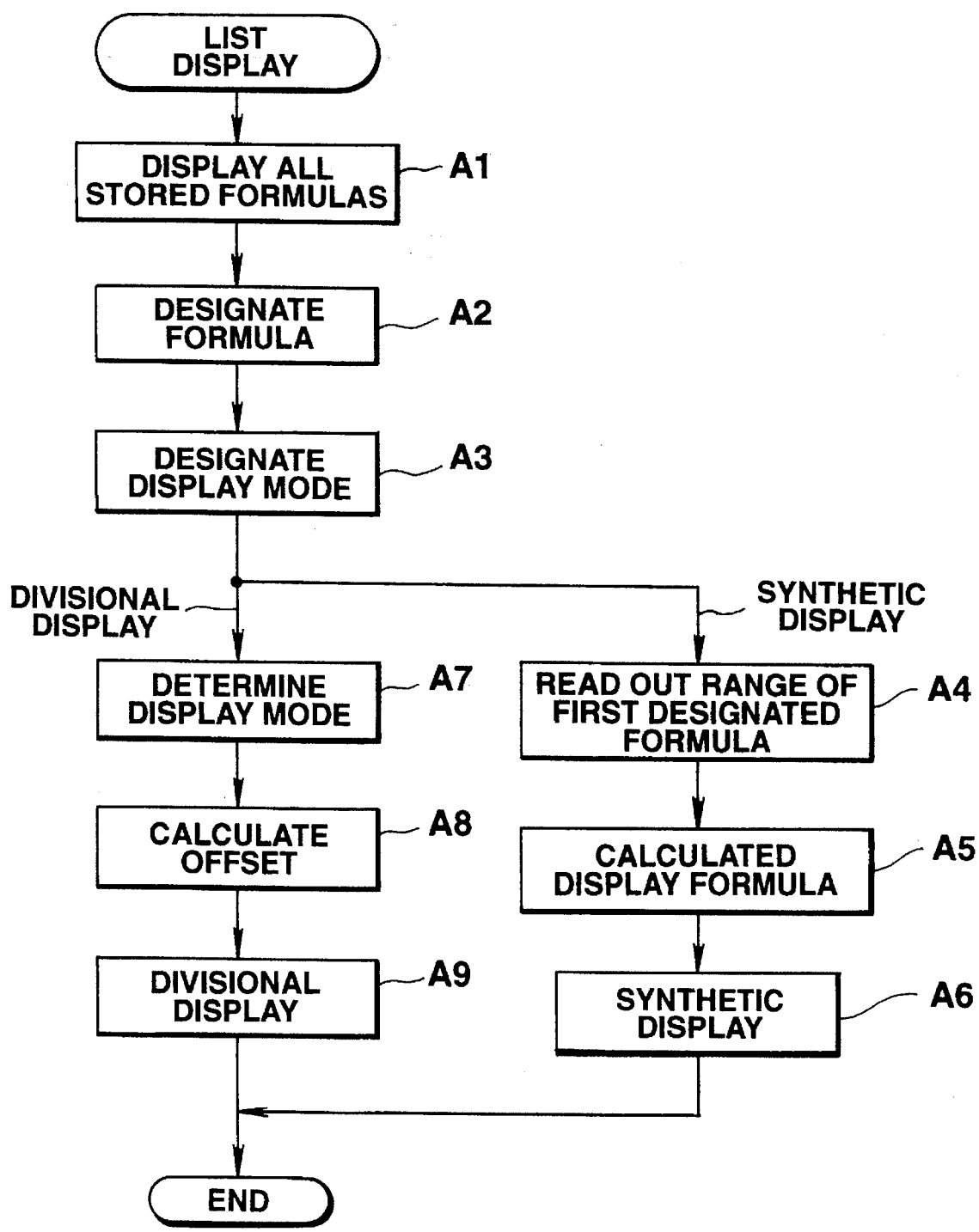

FIG. 4 is a flow chart showing synthetic/divisional graphic processing of a plurality of formulas by the graph display apparatus.

Figure 5:
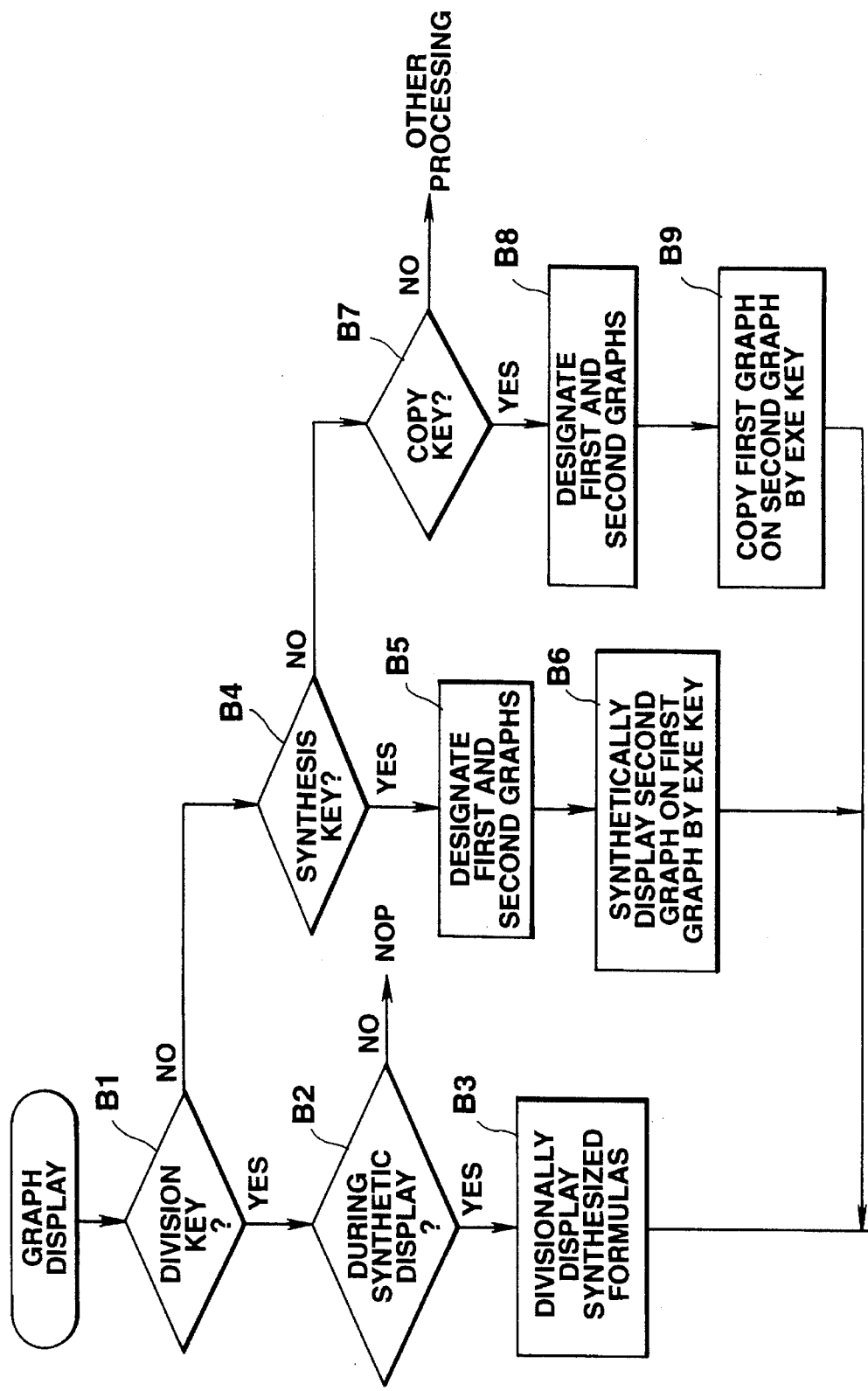

FIG. 5 is a flow chart showing division/synthesis/copy processing in a graph display state of the graph display apparatus.

Figure 6A:
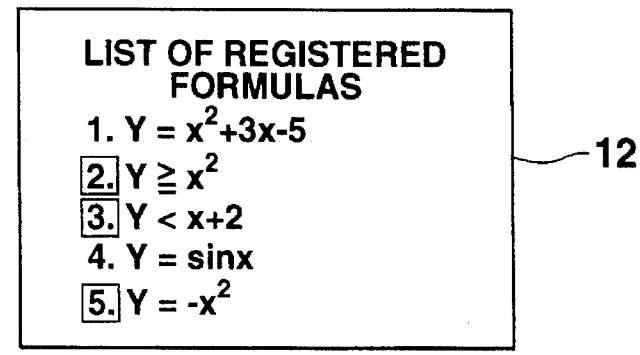
Figure 6B:
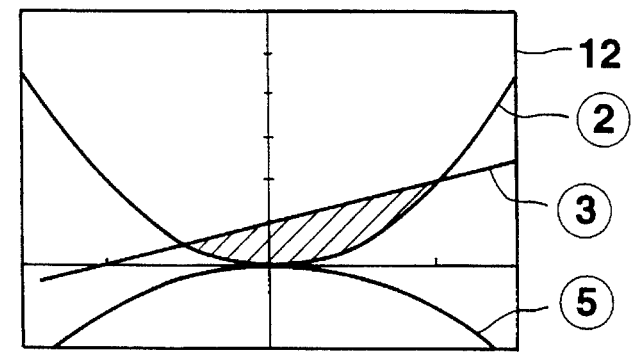
Figure 6C:
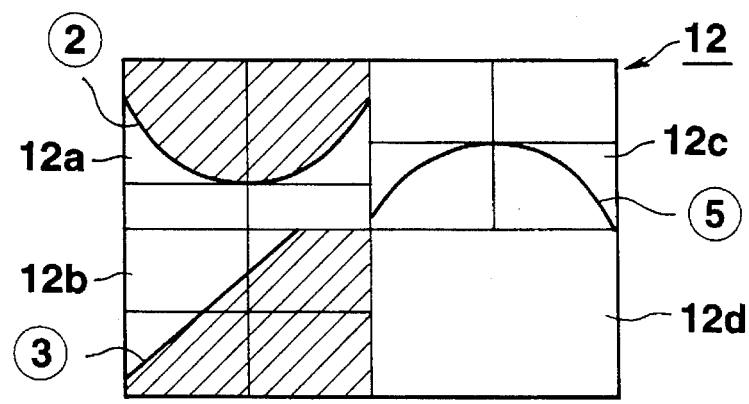
Figure 6D:
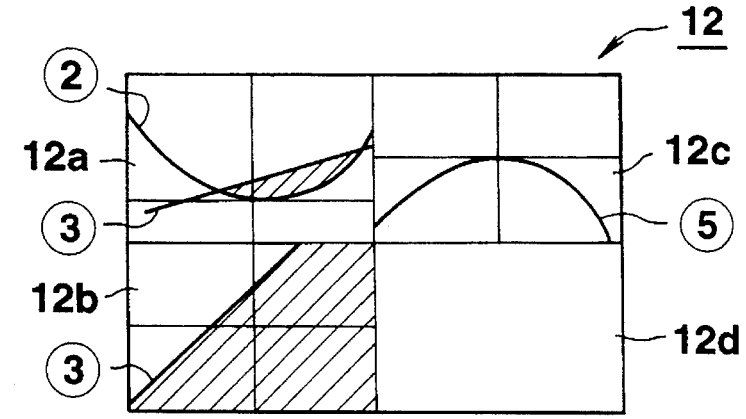

FIGS. 6A through 6D are views showing the display states on the graphic display unit 12 upon execution of graphic display processing of the graph display apparatus. More specifically, FIG. 6A is a view showing a list display state of input formulas, FIG. 6B is a view showing a synthetic display state of the graphs of a plurality of formulas, FIG. 6C is a view showing a divisional display state of the graphs of a plurality of formulas, and FIG. 6D is a view showing a synthetic display state of designated graphs in the divisional display state of the graphs of a plurality of formulas.

More specifically, the "list" key 16 on the key input unit 11 is operated in a state wherein, for example, five functional formulas and corresponding coordinate ranges are input and stored in the plurality of formula registers 25a, 25b, . . . and the plurality of range registers 26a, 26b, . . . in the RAM 24.

The synthetic/divisional graphic processing of a plurality of formulas in FIG. 4 is started, and all the five functional formulas (including inequalities and the like) stored in the formula registers 25a, 25b, . . . in the RAM 24 are read out, and the readout formulas are displayed with serial numbers (for example, "1" is assigned to a functional formula stored in the formula register 25a, "2" is assigned to a functional formula stored in the formula register 25b, and so on), as shown in FIG. 6A (step A1).

Assume that as functional formulas to be displayed as graphs, the second formula "$Y \geq x^2$", the third formula "$Y<x+2$", and the fifth formula "$Y=-x^2$" are designated by operating the cursor key 21 (step A2). Then, when a mode for synthetically displaying the plurality of designated formulas is selected and designated as a display mode, i.e., when a mode for displaying the plurality of designated functional formulas on a single coordinate system is selected and designated, a user operates the "synthesis" key 17 (step A3).

When the "synthesis" key 17 is operated, the flow advances to step A4, and coordinate ranges stored in the range register 26b in correspondence with the second formula designated first by the cursor key 21 are read out, thus setting X- and Y-coordinate ranges on the display unit 12.

Subsequently, x-axis coordinate values are substituted in the second, third, and fifth formulas in units of display dots in accordance with the coordinate ranges corresponding to the second formula so as to sequentially calculate corresponding Y-coordinate values, thus forming graphs (step A5).

In this manner, as shown in FIG. 6B, the X- and Y-coordinates of the coordinate ranges stored in the range register 26b in correspondence with the second formula are displayed, and graphs corresponding to the second, third, and fifth formulas are synthetically displayed on a single coordinate system which is set to have the coordinate ranges for the second formula (step A6).

In this case, coordinate regions common to inequalities such as the second and third formulas are distinguished from each other by, e.g., a reversal display.

In step A4, the graphs of the formulas are displayed using the coordinate ranges stored in correspondence with the formula which is designated first by the cursor key 21. Alternatively, a switch for selecting the coordinate ranges of a formula to be used may be arranged to select the coordinate ranges. Also, a detection means for detecting maximum and minimum X- and Y-coordinate values of the coordinate ranges corresponding to a plurality of designated formulas may be arranged, and the detected maximum and minimum X- and Y-coordinate values may be used as display coordinate ranges, so that the graphs of the designated formulas in the coordinate ranges stored in correspondence therewith can be displayed.

On the other hand, when the second formula "$Y \geq x^2$", the third formula "$Y<x+2$", and the fifth formula "$Y=-x^2$" are designated as functional formulas to be displayed as graphs upon operation of the cursor key 21 (step A2), and the plurality of designated formulas are to be divisionally displayed, i.e., the graphs of these formulas are to be independently displayed, the "division" key 18 is operated in designation of the display mode in step A3.

Then, the flow advances from step A3 to step A7, and since the three functional formulas to be displayed as graphs are designated, it is determined that the display frame is to be divided into four regions. Then, the graphic display unit 12 sets a first quadrant 12a of the display regions divided in the vertical and horizontal directions to be a display region for the graph of the second formula, a second quadrant 12b to be a display region for the graph of the third formula, and a third quadrant 12c to be a display region for the graph of the fifth formula (step A7), as shown in FIG. 6C.

More specifically, in step A7, the coordinate ranges corresponding to each functional formula are set to fall within a 32 (vertical dots)×64 (horizontal dots) display range. For this reason, the graph of the second formula stored in the register 25b is calculated, so that dots at the right end of the first quadrant 12a have the maximum value of the X-coordinate range stored in the register 26b, dots at the left end have the minimum value of the X-coordinate range stored in the register 26b, dots at the upper end have the maximum value of the stored Y-coordinate range, and dots at the lower end have the minimum value of the stored Y-coordinate range. Then, graph display data is stored in a region (not shown) in the RAM 24.

For the third and fifth formulas as well, dots at the respective end portions of the second and third quadrants 12b and 12c have maximum and minimum values of the coordinate ranges stored in the register 26c which stores the coordinate ranges of the third formula and a register 26e which stores the coordinate ranges of the fifth formula.

In step A8, a divisional display is attained, as shown in FIG. 6C.

With this operation, the arbitrarily designated functional formulas are divisionally displayed on different divided neighboring display regions in ranges corresponding to their coordinate ranges.

On the other hand, when the "division" key 18, the "synthesis" key 17, or the "copy" key 19 is operated while the graphs are divisionally or synthetically displayed, the processing shown in the flow chart in FIG. 5 is executed. First, when the "division" key 18 on the key input unit 11 is operated in this state, it is checked if the synthetic display mode is being performed (step B1→B2).

If Y (YES) in step B2, the graphs of the functional formulas, which are synthetically displayed on a single coordinate system, are re-calculated on the basis of their individual coordinate ranges in accordance with the above-mentioned divisional graphic processing in steps A7 through A9, and the re-calculated graphs are divisionally displayed on the corresponding quadrants 12a, 12b, and 12c, as shown in FIG. 6C (step B3).

On the other hand, when the "synthesis" key 17 is operated (step B4) while the graphs corresponding to the three functional formulas are divisionally displayed, as shown in FIG. 6C, if the cursor key 21 or the like is operated to sequentially designate, e.g., the graph of the second formula displayed on the first quadrant 12a and the graph of the third formula displayed on the second quadrant 12b (step B5), the graph of the third formula is re-calculated in correspondence with the coordinate ranges of the graph of the second formula, which is designated first, in response to a later operation of the "EXE" key 20, and the re-calculated graph of the third formula is synthetically displayed on the first quadrant 12a on the same coordinate system as that of the graph of the second formula (step B6), as shown in FIG. 6D.

Furthermore, when the "copy" key 19 is operated (step B7) while the graphs corresponding to the three functional formulas are divisionally displayed, as shown in FIG. 6C or 6D, if the cursor key 21 or the like is then operated to sequentially designate, e.g., the graph of the third formula displayed on the second quadrant 12b and the graph of the fifth formula displayed on the third quadrant 12c (step B8), the graph displayed on the second quadrant 12b is copy-displayed on the graph on the third quadrant 12c by logically ORing their dot data (step B9).

Therefore, according to the graph display apparatus with the above-mentioned arrangement, in a state wherein a plurality of functional formulas to be displayed as graphs and their coordinate ranges are input and stored in advance by operating the numeric · symbol keys 14 on the key input unit 11, the "list" key 16 is operated to display all the input formulas on the display unit 12. When a plurality of arbitrary formulas are designated and the "synthesis" key 17 is operated, the graphs of the designated formulas are calculated in accordance with the coordinate ranges of the functional formula, which is designated first, and are synthetically displayed. On the other hand, when the plurality of arbitrary formulas are designated and the "division" key 18 is operated, the graphs are separately calculated in accordance with the corresponding coordinate ranges and are divisionally displayed.

Furthermore, when the "synthesis" key 17 is operated in the divisional display state, and two graphs are designated, the other graph is synthetically displayed on the same coordinate system as that of one graph in response to the operation of the "EXE" key 20. On the other hand, when the "copy" key 19 is operated and two graphs are designated, one graph is copy-displayed on the other graph in response to the operation of the "EXE" key 20.

Therefore, the graphs of a plurality of formulas can be calculated based on their coordinate systems and can be displayed in comparison with each other, or can be selectively synthetically displayed, and individual graphs can be freely analyzed in association with other graphs.

In this embodiment, the designation or synthesis operation of functional formulas to be displayed as graphs or the designation operation of a graph to be copied is attained using key operation means such as the cursor key. For example, a touch panel may be stacked on the display unit 12, and various designation operations may be attained by touching the touch panel.

In this embodiment, when graph data calculated in correspondence with each function formula is stored in the RAM 24, 64 (vertical dots)×128 (horizontal dots) display data itself may be stored in a frame memory as bit map data. However, since such data requires a large memory capacity, graph data may be stored as only Y-dot coordinates Y1, Y2 . . . , Y128 corresponding to the number of display dots on the X-coordinate (128 dots).

As described above, according to the first embodiment of the present invention, when display mode selection means selects a display mode for displaying the graphs of a plurality of formulas on a single coordinate system, the graphs of the formulas can be calculated based on a single coordinate system corresponding to display range data of one of the plurality of formulas, and the calculated graphs can be synthetically displayed. On the other hand, when the display mode selection means selects a display mode for displaying the graphs of a plurality of formulas on different coordinate system, the graphs of the formulas are calculated based on different coordinate systems, which are divided in correspondence with the display range data in units of formulas, and the calculated graphs can be divisionally displayed.

Of the plurality of divisionally displayed graphs, a designated graph can be synthetically displayed on the coordinate system of another graph. On the other hand, of the plurality of divisionally displayed graphs, a designated graph can be copy-displayed on another graph.

With these functions, when the graphs of a plurality of formulas are calculated and displayed, they can be appropriately synthesized or divided and can be flexibly processed.

(Second Embodiment)

Figure 7:
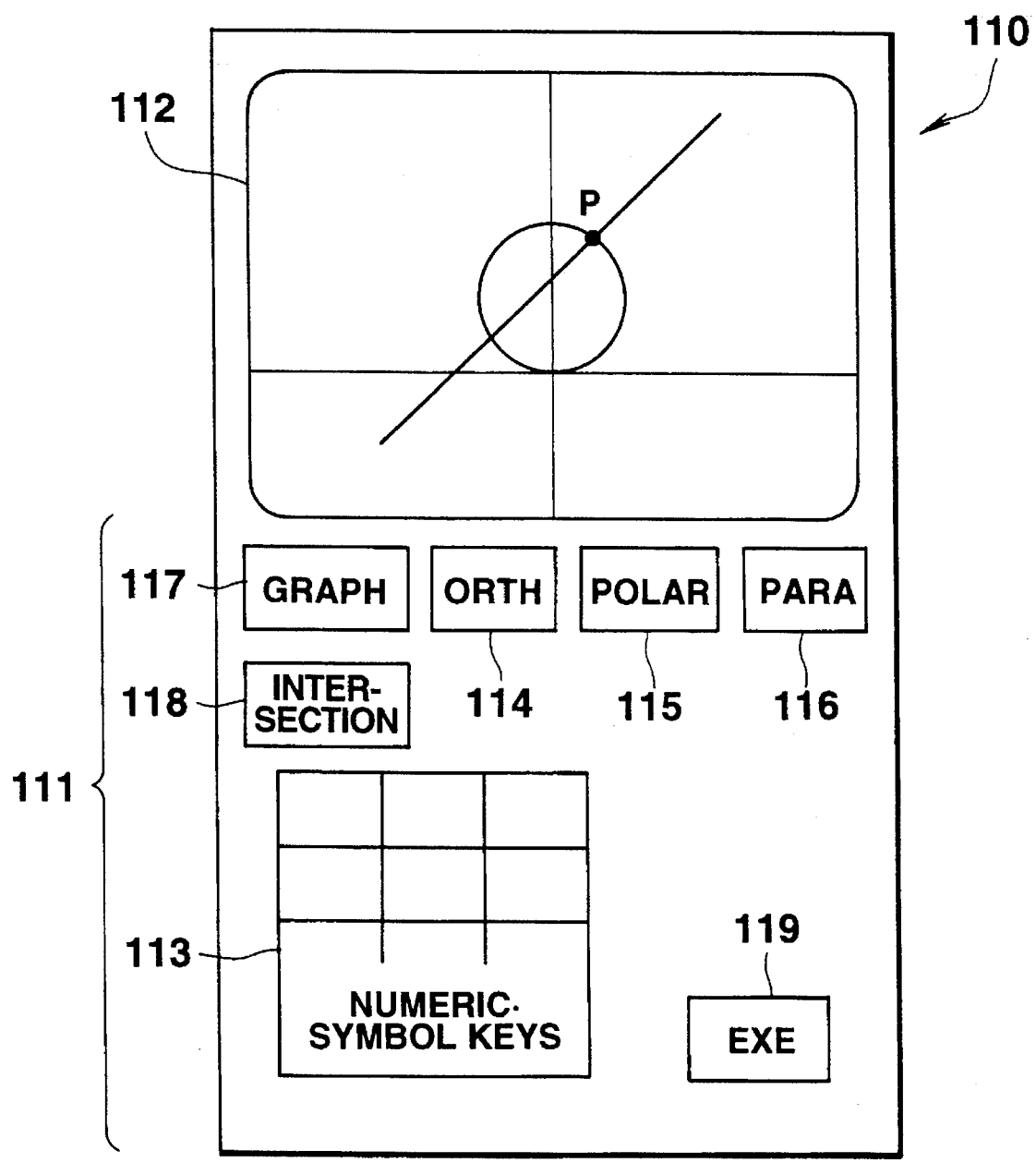

FIGS. 7 through 16 show the second embodiment of the present invention. FIG. 7 is a plan view showing the outer appearance of a functional calculator which incorporates a graph display apparatus according to the present invention.

An apparatus main body 110 of this functional calculator has a size which allows a user to hold the apparatus in his or her hand.

A key input unit 111 and a dot-matrix liquid crystal display unit 112 are arranged on the front surface of the apparatus main body 110.

The key input unit 111 comprises numeric · symbol keys 113 for inputting functional formulas and the like to be displayed as graphs, and for inputting coordinate ranges (Xmin, Xmax) and (Ymin, Ymax) of the X- and Y-axes upon calculation of the graphs of input formulas, an "orth" key 114 for designating an input of an orthogonal coordinate functional formula, a "polar" key 115 for designating an input of a polar coordinate functional formula, a "para" key 116 for designating an input of a parameter coordinate functional formula, a "Graph" key 117 for graphically displaying an input functional formula, an "intersection" key 118 for calculating intersection coordinates on the graphs of a plurality of functional formulas, an "EXE" key 119 for determining the input functional formula, and the like.

The graphic display unit 112 has a 64 (vertical dots)×128 (horizontal dots) liquid crystal display screen, and displays the graphs of functional formulas of different coordinate systems such as a functional formula of an orthogonal coordinate system, a functional formula of a polar coordinate system, a functional formula of a parameter coordinate system, and the like, which are input using the numeric · symbol keys 113 in correspondence with the coordinate ranges of the X- and Y-axes designated by a user.

For example, when the graphs of an input orthogonal coordinate functional formula and an input polar coordinate functional formula are simultaneously displayed on the graphic display unit 112, if the "intersection" key 118 is operated, intersection coordinates between the graphs are calculated, and points at the intersection positions on the graphs and the intersection coordinate values are displayed.

Figure 8:
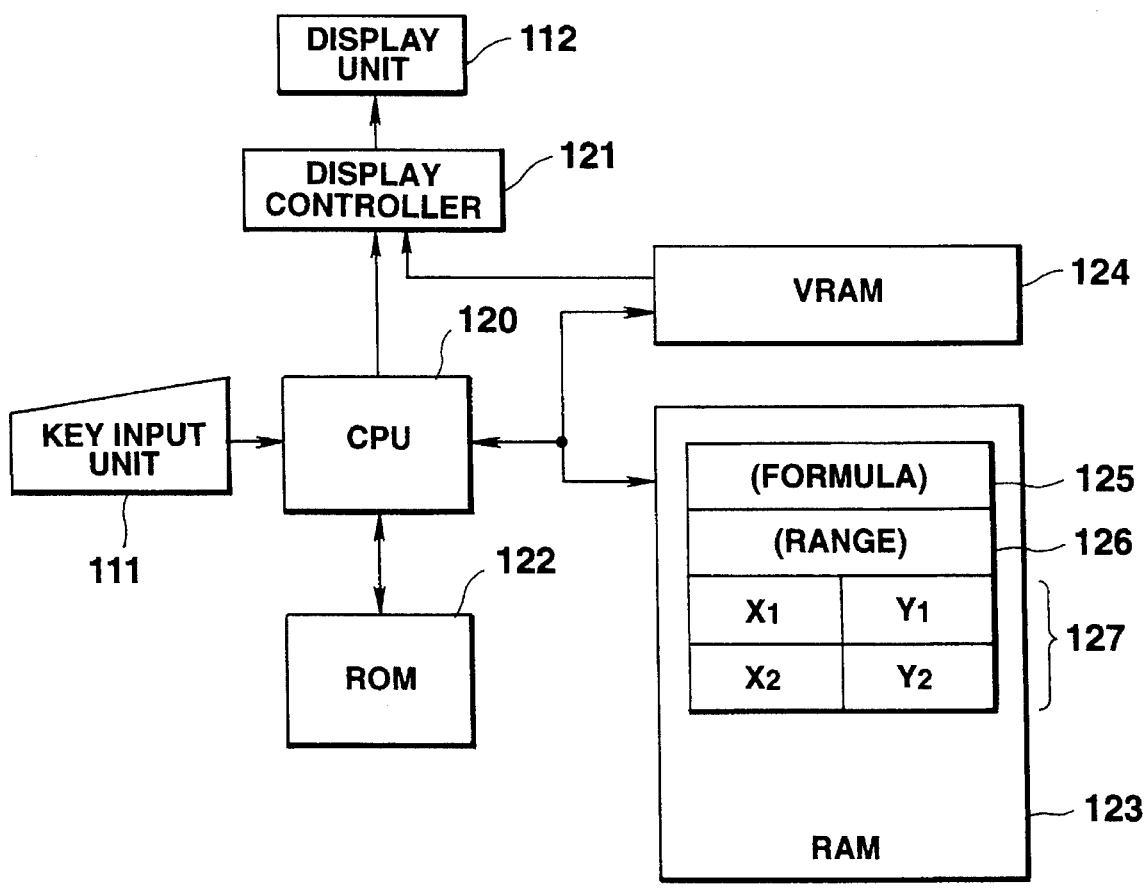

FIG. 8 is a block diagram showing the arrangement of an electronic circuit of the functional calculator.

The electronic circuit of the functional calculator comprises a CPU (central processing unit) 120, and the CPU 120 executes operation control of the respective circuit units.

The CPU 120 is connected to the key input unit 111 and to the graphic display unit 112 via a display controller 121, and is also connected to a ROM 122, a RAM 123, and a V (video) RAM 124.

The ROM 122 pre-stores a basic system program for operating the functional calculator, and also pre-stores a graph display processing program for performing a graph display in correspondence with a key-input functional formula and the like, an intersection arithmetic processing program for calculating intersection coordinates between a plurality of displayed graphs, and the like.

The control operation of the CPU 120 is executed in accordance with the programs stored in the ROM 122.

The RAM 123 comprises a formula register 125 for storing functional formulas input in accordance with operations of the numeric · symbol keys 113, "orth" key 114, "polar" key 115, "para" key 116, and the like, a range register 126 for storing X- and Y-coordinate ranges (Xmin, Xmax) and (Ymin, Ymax) set for the graphic display unit 112 upon graphic display of input formulas, intersection arithmetic registers 127 for storing a coordinate value (X1, Y1) corresponding to one functional formula transformed into a coordinate value of an orthogonal coordinate system and a coordinate value (X2, Y2) corresponding to the other functional formula as needed upon execution of the intersection arithmetic processing, and the like, in addition to key input registers, various flag registers, and the like.

The VRAM 124 has a video memory area having a one-to-one correspondence with dots on a display region of the graphic display unit 112, and stores graphic data corresponding to an input functional formula upon execution of the graph display processing.

The operation of the functional calculator with the above-mentioned arrangement will be described below.

Figure 9:
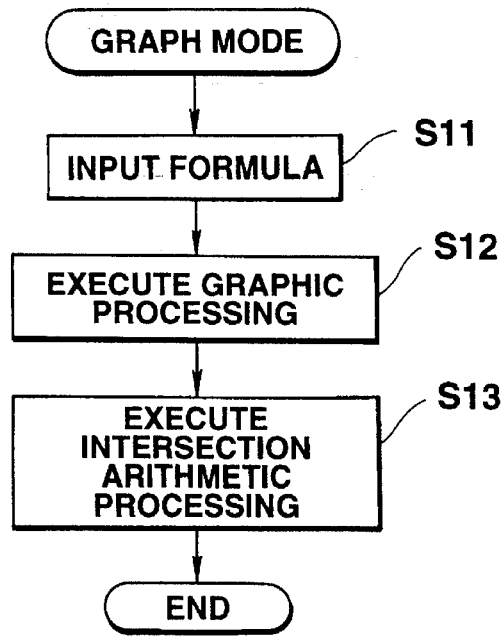

FIG. 9 is a flow chart showing the overall processing in a graph mode of the functional calculator.

Figures 15, 16:
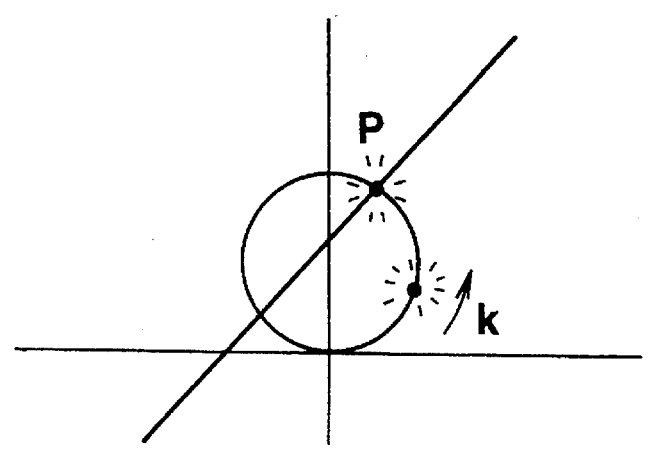

More specifically, in the overall processing in the graph mode shown in FIG. 9, when, for example, an orthogonal coordinate functional formula "Y=X+1", a polar coordinate functional formula "r=sin θ", and a parameter coordinate functional formula "Xt=2 cos T, Yt=2 sin T" are input by selectively operating the "orth" key 114, the "polar" key 115, and the "para" key 116 together with the numeric · symbol keys 113 on the key input unit 111, these input functional formulas are stored in the formula registers 125 in the RAM 123 and are also written in the VRAM 124. Then, the input formulas are displayed on the graphic display unit 112, as shown in FIG. 15 (step S11).

In this case, the parameter coordinate functional formula "Xt=2 cos T, Yt=2 sin T" is input by operating "para"→"2 cos T, 2 sin T"→"EXE", and is displayed in two lines on the display unit 112 together with "Xt=" and "Yt=".

Figure 10:
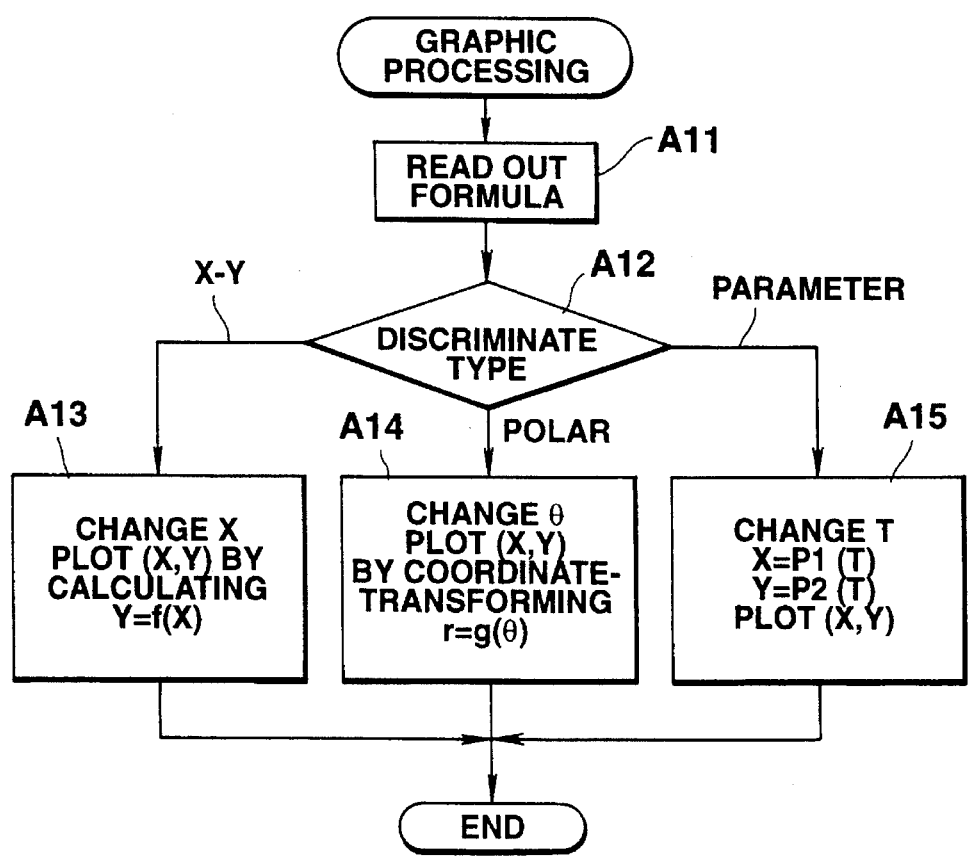

When the "Graph" key 117 is operated in a state wherein arbitrary functional formulas are input and stored in this manner, graphic arithmetic processing shown in detail in FIG. 10 is started, and the graphs of the input functional formulas are calculated and displayed on the graphic display unit 112 (step S12).

Figure 11:
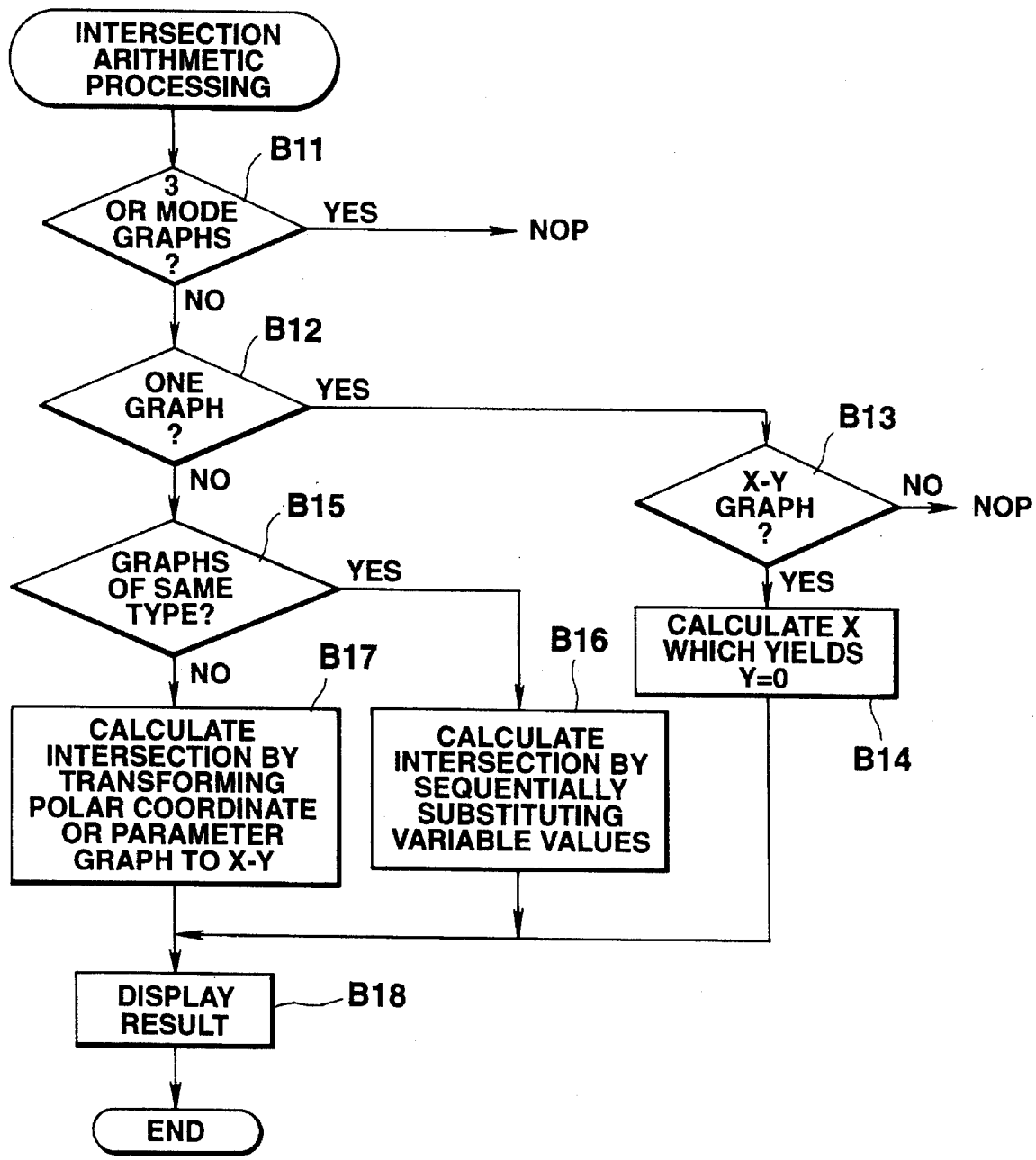

When the "intersection" key 118 is operated, overall intersection arithmetic processing shown in detail in FIG. 11 is started, and intersection coordinates between two functional formulas whose graphs are displayed by the graphic arithmetic processing are calculated and displayed (step S13).

FIG. 10 is a flow chart showing in detail the graphic arithmetic processing in step S12 upon execution of the graph mode processing of the functional calculator.

When the "Graph" key 117 is operated, a functional formula is read out from the formula register 125 in the RAM 123 in step A11, and the coordinate system of the readout functional formula is discriminated in step A12. Then, the flow advances to a step corresponding to the determined coordinate system. For example, when a functional formula "Y=X+1" is read out, it is determined that this formula is an orthogonal coordinate functional formula, and the flow advances to step A13. In step A13, when the orthogonal coordinate functional formula "Y=X+1" is read out, y-coordinate values corresponding to X-coordinate values in units of display dots are calculated in accordance with the X- and Y-coordinate ranges on the display unit 112, which ranges are pre-stored in the range register 126, and graphic data consisting of the calculated (X, Y) coordinate values is written in the VRAM 124. In addition, the calculated graph is displayed on the graphic display unit 112.

On the other hand, when, for example, a polar coordinate functional formula "r=sin θ" is read out from the formula register 125 in the RAM 123 in response to the operation of the "Graph" key 117, distances r from an origin, obtained when an angle θ having the X-axis as 0x is sequentially changed, are calculated, and (X, Y) coordinate values corresponding to the calculated (r, θ) are calculated by transformation of coordinate system. Then, the calculated graphic data is written in the VRAM 124 in accordance with the X- and Y-coordinate ranges on the display unit 112, which ranges are pre-stored in the range register 126, and is displayed on the graphic display unit 112 (step A4).

On the other hand, when, for example, a parameter coordinate functional formula "Xt=2 cos T, Yt=2 sin T" is read out from the formula register 125 in the RAM 123 in response to the operation of the "Graph" key 117, graphic data consisting of (X, Y) coordinate values obtained by sequentially changing a parameter T is written in the VRAM 124 in accordance with the X- and Y-coordinate ranges on the display unit 112, which ranges are pre-stored in the range register 126, and is displayed on the graphic display unit 112 (step A5).

When the "intersection" key 118 is operated in step S13 in FIG. 9, the overall intersection arithmetic processing shown in detail in FIG. 11 is started. More specifically, in step B11, it is checked if the number of graphs of functional formulas displayed on the graphic display unit 112 via the VRAM 123 is three or more. If YES in step B11, since two graphs to be objects for which intersections are calculated cannot be specified, the following intersection arithmetic processing is not executed.

In this case, of three or more graphs displayed on the graphic display unit 112, two graphs to be objects for which intersections are calculated may be designated, and the following intersection arithmetic processing may be executed.

When the number of displayed graphs is two or less, the flow advances to step B12 to check if the number of graphs is one or two. If it is determined that the number of graphs of functional formulas displayed on the graphic display unit 112 is one, and the displayed graph is that of an orthogonal coordinate functional formula "Y=X+1" (step B13), an x-coordinate value corresponding to a Y-coordinate value "0", i.e., an intersection coordinate "−1" with the X-axis is calculated in step B14, and the intersection coordinate value (−1, 0) is displayed by flickering the corresponding point on the graph. In addition, the X- and Y-coordinate values "X=−1, Y=0" are displayed on a lower portion of the graphic display unit 112 in step B18.

On the other hand, if it is determined in step B12 that the number of graphs of functional formulas displayed on the graphic display unit 112 is two, it is checked in step B15 if the formulas of both the graphs are functional formulas of the same coordinate system. If YES in step B15, a common variable value is sequentially changed and substituted in the two functional formulas to obtain points, where the solutions of the two equations coincide with each other, as intersection coordinates, and the calculated intersection coordinates are displayed as points on the graphs. In addition, the X- and Y-coordinate values of the points are displayed on the lower portion of the graphic display unit 112 (steps B16 and B18).

More specifically, when the functional formulas of both the two graphs displayed on the graphic display unit 112 are orthogonal coordinate functional formulas "Y1=f1(X1)" and "Y2=f2(X2)", Y-coordinate values Y1 and Y2 obtained when X-coordinate values X1 and X2 of these functional formulas are sequentially changed by the same value are calculated, and are stored in the corresponding intersection arithmetic registers 127 while updating their contents. In addition, a point where the Y-coordinate values Y1 and Y2 coincide with each other is displayed as the intersection coordinates, and its X- and Y-coordinate values are displayed on the lower portion of the graphic display unit 112.

When the functional formulas of both the two graphs displayed on the graphic display unit 112 are polar coordinate functional formulas "r1=g1(θ1)" and "r2=g2(θ2)", distances r1 and r2 obtained by sequentially changing angles θ1 and θ2 of these functional formulas by the same value are calculated, and corresponding X- and Y-coordinate values are stored in the intersection arithmetic registers 127 while updating their contents. In addition, a point where the X- and Y-coordinate values (X1=X2) and (Y1=Y2) coincide with each other are displayed as intersection coordinates, and its X- and Y-coordinate values are displayed on the lower portion of the graphic display unit 112.

Furthermore, when the functional formulas of both the two graphs displayed on the graphic display unit 112 are parameter coordinate functional formulas "X1=f1(T1), Y1=f1(T1)" and "X2=f2(T2), Y2=f2(T2)", X1 coordinates obtained by sequentially changing, e.g., a parameter T1 of the first functional formula are substituted as X2 coordinates of the second functional formula, Y2 coordinates based on a parameter T2 of the second formula obtained at that time are calculated, and these coordinate values are stored in the corresponding intersection arithmetic registers 127 while updating their contents. In addition, a point where the X- and Y-coordinate values (X1=X2) and (Y1=Y2) coincide with each other are displayed as intersection coordinates, and its X- and Y-coordinate values are displayed on the lower portion of the graphic display unit 112.

On the other hand, when the number of functional formulas displayed on the graphic display unit 112 is two, and the formulas of the two graphs are those of different coordinate systems, the flow advances from step B15 to step B17. In step B17, a polar coordinate value given by the polar coordinate functional formula or a parameter coordinate value given by the parameter coordinate functional formula is transformed into that of the orthogonal coordinate system, a point where Y-coordinate values obtained when variable values of the functional formulas are changed coincides with each other is obtained as intersection coordinates, and the intersection coordinates are displayed as a point on the graphs. In addition, the X- and Y-coordinate values are displayed on the lower portion of the graphic display unit 112 in step B18.

Figure 12:
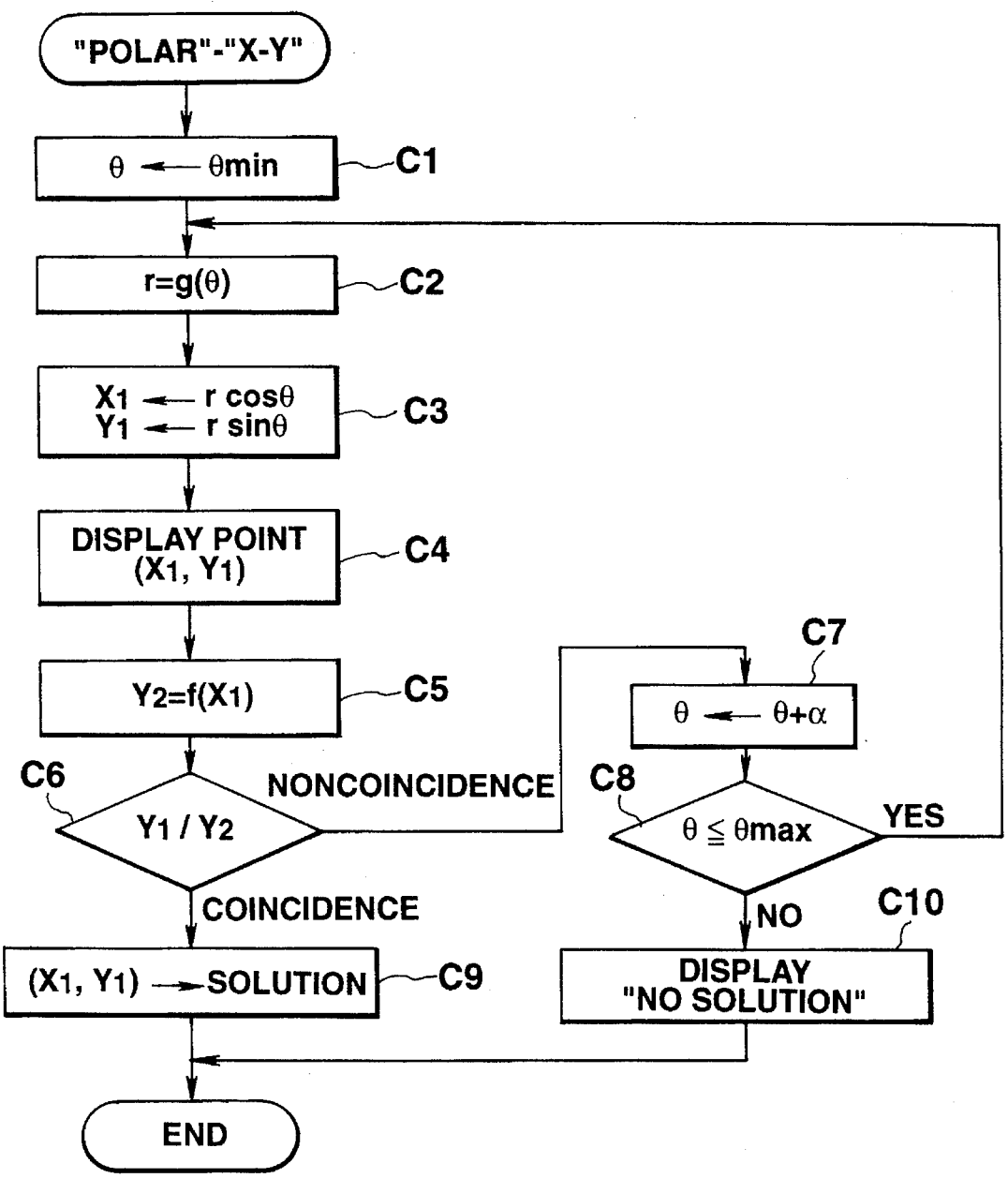

In step B17, if the functional formulas of the two graphs displayed on the graphic display unit 112 are a polar coordinate functional formula "r=g(θ)" and an orthogonal coordinate functional formula "Y=f(x)", as shown in, e.g., FIG. 16, intersection arithmetic processing between a polar coordinate system graph and an orthogonal coordinate system graph shown in FIG. 12 is started.

More specifically, a minimum value θmin is substituted in an angle θ of the polar coordinate functional formula "r=g(θ)" to calculate a distance r, an orthogonal coordinate value (X1, Y1) corresponding to a polar coordinate value (r, θmin) at that time is calculated by transformation of coordinate system, and the calculated coordinate value is stored in the intersection arithmetic registers 127 (steps C1, C2, and C3).

Then, a coordinate point (X1, Y1) corresponding to the current polar coordinate value (r, θmin) is displayed on the polar coordinate graph, and its X- and Y-coordinate values are displayed on the lower portion of the graphic display unit 112 (step C4).

The coordinate value X1 transformed into an orthogonal coordinate value is substituted in the orthogonal functional formula "Y=f(X)" to calculate a corresponding coordinate value Y2, and the calculated value is stored in the intersection arithmetic register 127. In this case, it is checked whether or not the coordinate value Y1 obtained by transforming the polar coordinate value (r, θmin) into an orthogonal coordinate value and the coordinate value Y2 obtained from the orthogonal functional formula "Y=f(X)" coincide with each other (steps C5 and C6).

If it is determined in step C6 that the coordinate values Y1 and Y2 calculated from the two functional formulas based on the polar coordinate variable θ do not coincide with each other, and the coordinate point (X1, Y1) displayed in step C4 is not an intersection of the two graphs, the polar coordinate variable 8 is updated to θ1 by adding (+α) (step C6→C7).

If it is determined that the updated polar coordinate variable θ (=θ1) does not exceed its maximum value θmax, the polar coordinate variable θ1 is substituted in the polar coordinate functional formula "r=g(θ)" to calculate a distance r1, an orthogonal coordinate value corresponding to the polar coordinate value (r1, θ1) at that time is calculated as (X1, Y1) by transformation of coordinate system, and the calculated values are stored in the intersection arithmetic registers 127 (step C8→C2, C3).

More specifically, upon repetition of the processing in steps C2 through C8, the polar coordinate variable is sequentially incremented by (+α) to θ2, θ3, . . . , and coordinate points (X1, Y1), which are obtained by transformation of coordinate system in correspondence with polar coordinate values (r2, θ2) (r3, θ3) at the corresponding timings, are sequentially displayed as a point P and X- and Y-coordinate values. In addition, it is checked if the coordinate value Y1 coincides with the coordinate value Y2 obtained from the orthogonal coordinate functional formula "Y=f(X)" on the basis of the coordinate value X1.

In this manner, in a state wherein the polar coordinate variable θ is sequentially updated, and the pointer P on the graph is moved and updated, as indicated by an arrow k in FIG. 16, if it is determined in step C6 that a coordinate point (X1, Y1) which is calculated by coordinate-transforming a polar coordinate value (r10, θ10) obtained when the polar coordinate variable θ is updated to, e.g., θ coincides with a coordinate value Y2 obtained from the orthogonal coordinate functional formula "Y=f(X)" based on the X-coordinate value X1, the coordinate point (X1, Y1) at that time is displayed on the intersection between the polar coordinate graph and the orthogonal coordinate graph as an intersection P, and the X- and Y-coordinate values are displayed on the lower portion of the graphic display unit 112 (step C6→9, B18).

On the other hand, in a state wherein the polar coordinate variable θ is sequentially updated, and the pointer P on the graph is moved and updated, if it is determined in step C8 that the updated polar coordinate variable θn has exceeded its maximum value θmax, it is determined that the polar coordinate graph and the orthogonal coordinate graph displayed on the graphic display unit 112 have no intersection, and a no-solution message "no intersection" is displayed on the lower portion of the display unit 112 (step C8→C10, B18).

Figure 13:
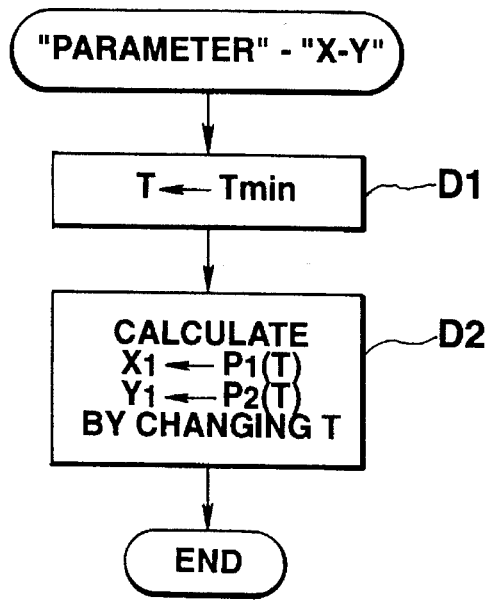

On the other hand, when the functional formulas of the two graphs displayed on the graphic display unit 112 are a parameter coordinate functional formula "X=P1(T), Y=P2(T)" and an orthogonal coordinate functional formula "Y=f(X)", intersection arithmetic processing between a parameter coordinate system graph and an orthogonal coordinate system graph shown in FIG. 13 is started in step B17.

More specifically, in the intersection arithmetic processing between a parameter coordinate system graph and an orthogonal coordinate system graph, X- and Y-coordinates obtained from the functional formula "X=P1(T), Y=P2(T)" when a parameter T is sequentially changed are defined as a coordinate point (X1, Y1), and it is checked in the same manner as in the intersection arithmetic processing between a polar coordinate system graph and an orthogonal coordinate system graph whether or not the coordinate value Y1 coincides with a coordinate value Y2 obtained from the orthogonal coordinate functional formula "Y=f(X)" based on the coordinate value X1. In a state wherein the parameter T is sequentially updated, and the pointer P on the graph is moved and updated in this manner, if it is determined that a coordinate point (X1, Y1) obtained when the parameter T is updated to T10 coincide with a coordinate value Y2 obtained from the orthogonal coordinate functional formula "Y=f(X)" based on the X-coordinate value X1, the coordinate point (X1, Y1) at that time is displayed on the intersection between the parameter coordinate graph and the orthogonal coordinate graph as an intersection P (steps D1 and D2), and the X- and Y-coordinate values are displayed on the lower portion of the graphic display unit 112 (step B18).

Figure 14:
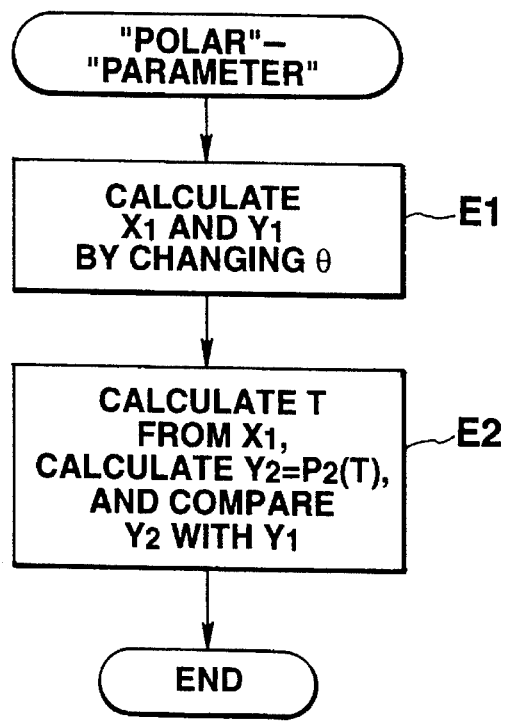

On the other hand, when the functional formulas of the two graphs displayed on the graphic display unit 112 are a polar coordinate functional formula "r=g(θ)" and a parameter coordinate functional formula "X=P1(T), Y=P2(T)", intersection arithmetic processing between a polar coordinate system graph and a parameter coordinate system graph shown in FIG. 14 is started in step B17.

More specifically, in the intersection arithmetic processing between a polar coordinate system graph and a parameter coordinate system graph, a polar coordinate value (r, θ) obtained from the functional formula "r=g(θ)" when a polar coordinate variable θ is sequentially changed is coordinate-transformed into a coordinate point (X1, Y1), and a Y-coordinate value, which is calculated by substituting a parameter T calculated by substituting the coordinate value X1 in the parameter coordinate functional formula "X=P1 (T)" in the parameter coordinate functional formula "Y=P2(T)" again is defined as Y2, thereby checking a coincidence/noncoincidence between the Y-coordinate value Y2 and the orthogonal coordinate value Y1 corresponding to the polar coordinate system. In a state wherein the polar coordinate variable θ is sequentially updated, and the pointer P on the graph is moved and updated in this manner, if it is determined that a coordinate point (X1, Y1) obtained when the variable θ is updated to θ10 coincides with a coordinate value Y2 calculated from the parameter coordinate functional formula "X=P1(T), Y=P2(T)" by substituting the X-coordinate value X1 in this formula, the coordinate point (X1, Y1) at that time is displayed on the intersection between the polar coordinate graph and the parameter coordinate graph as an intersection P (steps E1 and E2), and the X- and Y-coordinate values are displayed on the lower portion of the graphic display unit 112 (step B18).

Therefore, according to the functional calculator with the above-mentioned arrangement, when, for example, a polar coordinate functional formula "r=g(θ)" and an orthogonal coordinate functional formula "Y=f(X)" are stored in the formula register 125 in the RAM 123 by selectively operating the numeric · symbol keys 113, the "orth" key 114, the "polar" key 115, and the "para" key 116, and the graphs of these functional formulas are calculated and displayed on the graphic display unit 112 by operating the "Graph" key 117, if the "intersection" key 118 is operated, a polar coordinate value (r, θ) calculated by sequentially updating a polar coordinate variable θ is transformed into an orthogonal coordinate value (X1, Y1), a coordinate value Y calculated by substituting the coordinate value X1 in the orthogonal coordinate functional formula "Y=f(x)" is defined as Y2, and a coincidence between Y1 and Y2 is checked to obtain an intersection coordinate value between the two graphs. The obtained intersection P is displayed as a point on the graph, and its coordinate value (X1, Y1) is displayed.

Therefore, an intersection between the graphs of functional formulas of different coordinate systems can be easily calculated.

In this case, in a state wherein the polar coordinate variable θ is sequentially updated to update a polar coordinate value (r, θ), since the pointer P indicating the coordinate point (X1, Y1) on the graph is moved and updated, a process for calculating an intersection between the graphs of the functional formulas displayed on the graphic display unit 112 can be visually confirmed.

What is claimed is:

1. A graph display apparatus comprising:

graph display means capable of displaying a graph;

a plurality of display range data storage means for storing display range data of a plurality of formulas whose graphs are displayed on said graph display means;

display mode selection means for selecting one of a display mode for displaying graphs of the plurality of formulas on a single coordinate system and a display mode for displaying graphs of the plurality of formulas on different coordinate systems;

first display control means for, when said display mode selection means selects the display mode for displaying graphs of the plurality of formulas on a single coordinate system, displaying coordinate axes based on display range data stored in one of said plurality of display range data storage means on said graph display means, and displaying graphs of the plurality of formulas in correspondence with the coordinate axes; and second display control means for, when said display mode selection means selects the display mode for displaying graphs of the plurality of formulas on different coordinate systems, reading out display range data corresponding to the plurality of formulas from said plurality of display range data storage means, and simultaneously displaying graphs of the plurality of formulas in corresponding display ranges.

2. An apparatus according to claim 1, wherein said graph display means comprises a dot-matrix type liquid crystal display device.

3. An apparatus according to claim 1, wherein said display mode selection means comprises first key means used for displaying graphs of the plurality of formulas on a single coordinate system, and second key means used for displaying graphs of the plurality of formulas on different coordinate systems.

4. An apparatus according to claim 1, further comprising synthesis means for synthetically displaying one of graphs of the plurality of formulas on another graph when said second display control means simultaneously displays graphs of the plurality of formulas.

5. An apparatus according to claim 1, further comprising synthesis means for synthetically displaying one of graphs of the plurality of functional formula data on another graph when said second display control means simultaneously displays graphs of the plurality of functional formula data.

6. A graph display apparatus comprising:

graph display means capable of displaying a graph;

functional formula input means for inputting a plurality of functional formula data;

functional formula storage means for storing the plurality of functional formula data input by said functional formula input means;

a plurality of display range data storage means, arranged in correspondence with the plurality of functional formula data stored in said functional formula storage means, for storing display range data used when graphs of the plurality of functional formula data are displayed on said graph display means;

display mode selection means for selecting one of a display mode for displaying graphs of the plurality of functional formula data on a single coordinate system and a display mode for displaying graphs of the plurality of functional formula data on different coordinate systems;

first display control means for, when said display mode selection means selects the display mode for displaying graphs of the plurality of functional formula data on a single coordinate system, simultaneously displaying graphs of the plurality of functional formula data on the basis of display range data stored in one of said plurality of display range data storage means; and second display control means for, when said display mode selection means selects the display mode for displaying graphs of the plurality of functional formula data on different coordinate systems, reading out display range data corresponding to the plurality of functional formula data from said plurality of display range data storage means, and simultaneously displaying graphs of the plurality of functional formula data in corresponding display ranges.

7. An apparatus according to claim 6, wherein said graph display means comprises a dot-matrix type liquid crystal display device.

8. An apparatus according to claim 6, wherein said display mode selection means comprises first key means used for displaying graphs of the plurality of functional formula data on a single coordinate system, and second key means used for displaying graphs of the plurality of functional formula data on different coordinate systems.

9. An apparatus according to claim 6, further comprising selection means for selecting a plurality of functional formula data to be displayed as graphs by said first and second display control means from the plurality of functional formula data stored in said functional formula storage means.

10. A graph display apparatus comprising:

formula storage means for storing formula data of two different coordinate systems of orthogonal coordinates and polar coordinates;

graph display means for displaying graphs of formula data of the two different coordinate systems stored in the formula storage means;

coordinate transformation means for transforming a coordinate value of the formula data of one coordinate system into a coordinate value of the other coordinate system for the formula data of the two different coordinate system displayed on the graph display means; and intersection arithmetic means for calculating an intersection between the graphs of the formula data of the two different coordinate systems by comparing a transformed coordinate value of the one coordinate system transformed by the coordinate transformation means with a coordinate value of formula data of the other coordinate system.

11. An apparatus according to claim 10, wherein said graph display means comprises a dot-matrix type liquid crystal display device.

12. An apparatus according to claim 10, further comprising intersection coordinate display means for displaying a coordinate value of the intersection calculated by said intersection arithmetic means.

13. An apparatus according to claim 10, wherein said graph display means displays the graphs of the two formula data stored in said formula storage means using a same pair of coordinate axes.

* * * * *